Feb. 5, 1963

M. FAMELY 3,076,668

FITTINGS FOR RETAINING CYLINDRICAL MEMBERS IN PLACE

Filed Oct. 9, 1957

INVENTOR
MAX FAMELY
BY John H. Graham
His Agent

United States Patent Office 3,076,668
Patented Feb. 5, 1963

3,076,668
FITTINGS FOR RETAINING CYLINDRICAL
MEMBERS IN PLACE
Max Famely, Linden, N.J.
(2404 Tam Drive, Las Vegas, Nev.)
Filed Oct. 9, 1957, Ser. No. 689,110
2 Claims. (Cl. 285—159)

The present invention relates in general to the provision of fittings of the type utilized for retaining cylindrical members in place where they pass through structural walls, for example. It is particularly concerned with providing a fitting which can be utilized for firmly fixing in place a tubular member, such as a hydraulic or similar transmission line where it passes through structural walls or like members, to anchor the tubular member firmly in place.

In industry, there are many places where it is necessary to install and hold permanently in place a tubular or like cylindrical member such as a line or conductor at the place where it passes through a wall or like retaining structure, and the requirements are many with respect to such securing of the line or like conductor in its position. It is necessary that the securing be a positive one which does not materially reduce the diameter of the member particularly if a tube is utilized, and at the same time the pressures used for causing the cylindrical member to be held in place should be both positive and firm, yet the joint must be capable of withstanding forces which will tend to disturb the security of the attachment. This is particularly the case in environments where the installation is subjected to vibrationary forces which tend to loosen any coupling or fitting since this can ultimately result in damage and breakdown. In the aviation industry, as a particular example, such problems exist and a provision of a positive lock for securing the transmission lines for hydraulic fluids and like conductors in the selected location where they pass through plates, walls and the like, is a very important factor in the aviation industry.

A further problem which is faced in industry generally, and particularly in the aviation industry, is that of accessibility to the point of installation of many of the fittings and supports for the various transmission lines and conductors. In many cases these lines pass through structural members in positions which are very difficult to get at and thus any fitting or like coupling which is used to support the transmission line or conductor relative to the structural member must be quick in action, positive in application and foolproof from the point of view that a bad joint or connection must not be made. Accordingly, fittings which call for screwing the various parts together or in other ways manipulating the parts relative to each other have many disadvantages when such problems of lack of accessibility are met with.

The present invention is particularly concerned with the provision of such a fitting or coupling that can be utilized for the various purposes defined of supporting and securing a cylindrical member in position where it passes through a structural member in a very positive manner with the minimum of difficulty of assembly and the maximum degree of security and strength of the holding power of the fitting or coupling when in place.

It is accordingly the major object of the present invention to provide a fitting or supporting coupling for mounting a cylindrical member, such as a conductor, tube or transmission line or the like within a structural member or wall or like part in a positive manner with ease of installation, minimum need of accessibility to the location and a maximum resistance of the coupling or mounting, when finished, to vibration or other distributing forces tending to loosen or disturb the attachment.

It is a further object of the present invention to provide a fitting of the type defined which is easy to manufacture and made with a minimum of parts whereby it is economical to use. It is another object of the invention to provide a fitting of the type and general nature defined, particularly for use in installing and mounting a cylindrical member of the general form described in place in a structural member and through said member wherein the parts are formed of plastic material and where the natural resiliency of the plastic is utilized to obtain the necessary binding action of the fitting when in place and the gripping upon the cylindrical member so carried. It is also an object of the invention to provide a fitting of the nature defined which needs the minimum of effort to assemble in order to mount the cylindrical member within and through the structural member which is foolproof in action and which can be maneuvered in small spaces, readily, without any danger of the fitting not being properly attached and the joint being not properly made.

Generally, in practicing the present invention, the fitting itself is composed of two separate parts, the one of which being a male member and the other being a female member. Each of the male and female members of the fitting is generally tubular shape having an integral flange at one end. The male member has a longer barrel or body portion than the female member and is adapted to pass therethrough under pressure as hereinafter described. The external contour of the male member is tubular and that of a straight-sided cylinder as is the internal surface of the male member, but the female member has a tapered internal bore, the widest diameter of which is slightly larger than the mean diameter of the outer face of the male member, for the purpose hereinafter defined. However, the outer contour of the female member is cylindrical and is adapted to enter into a clearance bore within the structural member where the fitting is to be mounted. The thickness of the plate or like structural member, namely the width of the bore through said structural member is substantially the same dimension as the length of the body or barrel of the female member. In action the female member is inserted in the bore within the structural member which is a clearance fit therefor, as in conventional practice, whereby the whole of the surface of the barrel is substantially retained externally by the metal or like body material of the structural member, and thus, this resists any efforts to expand or dislodge the outer surface or external periphery of the female member. As already mentioned, a flange at one end of said female member seats the female member correctly in position within the bore of the structural member. If now the male member is inserted in the female member in such direction that it approaches the widest diameter of the tapered bore of the female member and goes forward until the flange on the male member makes contact with the flange on the female member, the taper will cause a definite disturbance of the material of the male member. Since the body or barrel at least, of both male and female members is formed of a plastic material, such as nylon, and thus has a degree of yieldability and flowability which is inherent in such materials, the material of the male member will be distorted under the pressure created when the male member is bodily forced through the female member against the taper of the female member, and it is obvious that the degree of taper of the conical interior face of the female member determines how much disturbance of the body of the male member will occur and in like manner this will determine the amount of force or pressure necessary to force the male member through the female member. Since, as previously stated, the male member has a longer barrel than the female member, the male member will protrude therebeyond at the end furthermost from the flange and normally will tend to upset into an overlap or lock upon being released after passing through said tapered area. This disturbance of the material of the body of the male member is relied upon for the interlocking action upon the cylindrical object carried within the male member to now be described.

It should be realized, at this point, that if the outer periphery of the female member is retained from flowing under pressure and if the male member is forced by pressure through the female member, the disturbed body material of the male member must go somewhere and will flow to the area of least resistance.

From the above description it is obvious that if now a cylindrical member, such as transmission line or tube, or an electrical conductor formed as a hollow tube of plastic or copper, is placed within the cylindrical bore of the male member and the parts are assembled in the manner above defined, when the male member is forced into and through the female member, with the latter in place in a bore in a structural member, since the material of the male member will not be able to displace to the same extent it will tend to materially displace at the portion where the body of the male member protrudes beyond the body of the female member and thus cause the desired locking action. However, the internal diameter of the male member will be so under a pressure that it will tend to be forced into binding contact with the cylindrical or tubular member therewithin and cause a very strong frictional grip whereby said member will be firmly held and locked therewithin. If a tubular member of plastic or of thin copper tubing is used, which is not unusual in such installations for hydraulic lines, electric lines and the like, the member will also tend under the pressures exerted to be slightly deformed at least at its exterior surface, and thus the plastic will become imbedded or interlocked where the exterior surface of the tubular member is in the greatest stress in contact with the interior face of the tubular male member. Depending on the degree of taper of the inner bore of the female member, this will be at an area toward the exit end of the female member.

The degree of interlock thus achieved will be in part a function of the resistance to such exerted pressures by the outer surface of the cylindrical member. Thus, the degree of interlocking at this area can be selected and varied as desired.

There is provided by this means a very positive locking action on any form of cylindrical member carried by the fitting. If the cylindrical member is selected of material of the form which has some minor yieldability only, then the locking will be relatively light and may be negligible. If the material selected is very yielding, the locking may be more positive, both with respect to the cylindrical member within the barrel or body of the male member as well as the locking of the male member around the female member at the point where it projects therebeyond. As previously stated, the material displaced or stressed by the pressures created by the taper of the female member must move somewhere and by selection of the type of material for the body of the male member, the body of the female member and the outer casing, surface or sheath of the cylindrical member, variations of grip of the cylindrical member within the bore in the structural member can be achieved.

In order to assist in the assembly of the unit, the forward or entering edge of the male member may be chamfered or rounded off and a corresponding countersinking or rounding off may take place at the entering complementary edge of the female member, namely at its widest diameter, whereby the parts can be initially pressed together and nested and will hold in a preassembly position while they are all placed within the bore of the structural member. In like manner, the forward end of the female member may be chamfered or rounded off in order to assist its insertion within the bore of the structural member. Since in some instances such assembly of the parts takes place where the accessibility to the structural member is limited or restricted, the initial nesting of the various parts by means of these chamfers is helpful.

It is obvious that the choice of materials and the selection of dimensions of the various parts with respect to this fitting can be so made as to give the maximum amount of binding action and locking desired and the required degree of locking is variable, at will. It is also obvious that once the assembled fitting as a unit has been put in place and pressure applied it cannot be disturbed and cannot become unlocked since the actual body material of the male member has been flowed and displaced to a new form under the pressures exerted thereon and the contacts at the locking areas may be considered as bonded or welded, for all interests and purposes.

Any form of tool can be utilized to cause the driving in of the male member through the female member in position in the structural member, as hereinbefore described, since a straight drive is all that is required. For example, a hammer may be used for the purpose of impact and a tool may be utilized therewith in the form of a cylinder of metal split longitudinally to permit it to surround the inner cylindrical or tubular member to be held by the fitting, and make contact with the flange on the male member whereby the impact of the hammer can be utilized to drive the parts into their final locked position. Other forms of tool are obvious and not part of the present invention, since all that is required is a driving force sufficient to pass the male member through the female member.

Reference will now be made to the accompanying figures of the drawings which illustrate one modification for carrying out the present invention and in which.

Referring now specifically to the drawings.

Figure 1:
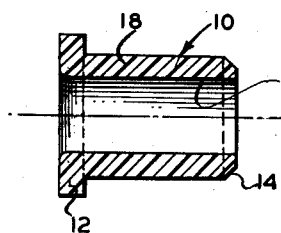
FIGURE 1 is a cross-section elevation of the male member of the fitting, in accordance with the preferred form of the present invention.

In FIGURE 1 there is illustrated a male member 10 according to the present invention, which comprises a body member 18 with an integral circular flange 12 having an internal bore 16 which is a straight cylinder. As illustrated in FIGURE 1, the external surface of the male member 10 is also a straight cylinder and there is upon the forward or entering end thereof a chamfer, rounding off or bevel 14.

Figure 2:
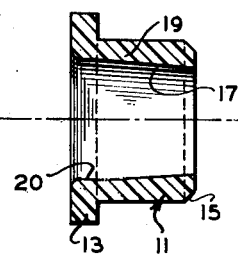
FIGURE 2 is an elevation in cross-section of the female member of the fitting in accordance with the preferred form of the present invention.

In FIGURE 2 there is illustrated the female member of the present invention which cooperates with the male member of FIGURE 1. Female member 11 comprises a barrel or body portion 19 which has an external surface which is a straight cylinder and an integral circular flange 13. In accordance with the present invention, the internal bore of female member 11 is generally tapered or frustro-conical as shown at 17, its widest area or diameter being at the flange end. At the widest diameter there is a portion which is illustrated at 20 to be chamfered, rounded off or beveled substantially to match the bevel 14 of FIGURE 1 whereby upon the entry of the male member 10 into the female member 11 in the direction to the right of FIGURES 1 and 2 initially the two members 10 and 11 will nest and be initially held together by such nesting. At the forward end, namely, opposite the flange end, of the female member 11, there is a bevel, rounding off or chamfer 15, for the purpose hereinafter defined. As will be readily seen from FIGURES 1 and 2, in comparison, the external diameter of the barrel 18 is equivalent substantially to the internal diameter at the flange end of the tapered bore 17 of the barrel 19, whereby initially when the two parts are placed together and nested as previously mentioned, the one part is held within the other.

Figure 3:
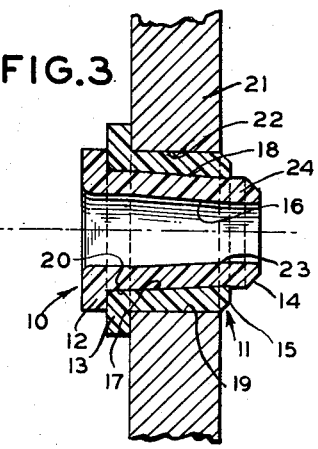
FIGURE 3 is a cross-sectional elevation of the parts of FIGURES 1 and 2 when in position together within the body of a structural member but without any member being present to be held by said fitting, whereby to show the action of the fitting.
Figure 4:
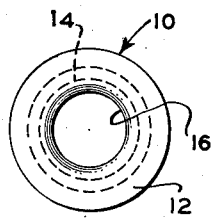
FIGURE 4 is an end view of the male member of FIGURE 1.
Figure 5:
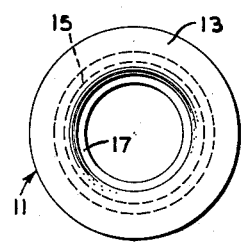
FIGURE 5 is an end view of the female member of FIGURE 2.

Reference is now made to FIGURE 3 wherein there is illustrated the relationship of the male and female members forming the fitting of the present invention when they are inserted within a structural member, for the purpose desired. A structural member or plate 21, is shown having therethrough a straight bore 22 which is of diameter substantially equal to the external diameter of the barrel 19 of the female member, namely, a clearance bore for the size of female member used. As illustrated, it will readily be discerned that the width or thickness of the plate 21 is equal to the width or length of the body of the barrel 19 of the female member, namely that the female member which will be utilized for the plate will be of length to match the width of the plate through which the device is to be placed and with which the device is to operate. Thus, as shown, the whole of the external surface of the body 19 of the female member is supported by the internal diameter of the bore 22 in which it is seated except for the chamfered portion 15. Chamfered portion 15 is utilized solely for the purpose of permitting the female member 11 to be initially seating in the bore 22 and held there. Thus, the male member 10 is nested in the female member 11 and this unit, forming the basis of the fitting of the present invention, is slipped into bore 22 using the chamfer 15. Since the plate 21 may be relatively inaccessible the nesting of male member 10 and female member 11 and the easy initial insertion into bore 22 is highly desirable. It is obvious however, that bevel 14 and bevel 15 could be dispensed with, in practicing the invention and are not needed except as refinements, for ease in use of the fitting comprising male member 10 and female member 11.

With the parts in the position of FIGURE 3, if now the male member 10 is forced through the female member 11 as is possible under driving force or pressure, the parts will assume the position shown in FIGURE 3, namely, since the female member 11 cannot give or flow in bore 22 and since its inner bore is tapered, the body material of the male member 10 must give flow or displace under the pressure forcing the male member through the female member and as shown, there will be a hump or deformation 24 in the deepest part of the taper, and the portion which extends beyond the body 19 will upset or overflow as at 24 and tend to lock in position thereby preventing withdrawal of the male member out of contact with the female member. This will be the form assumed with the parts unopposed by an object carried within the male member.

Figure 6:
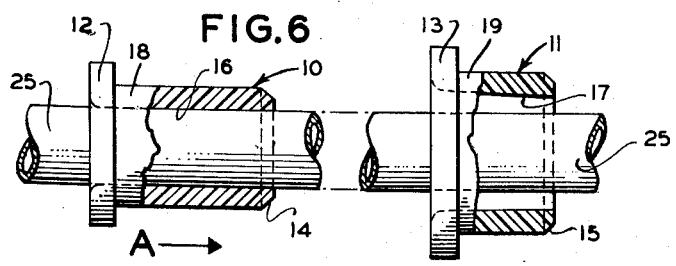
FIGURE 6 is an elevation, with parts in section, of the male and female members mounted ready for assembly upon a tubular or other cylindrical member to be held within a structural member.
Figure 7:
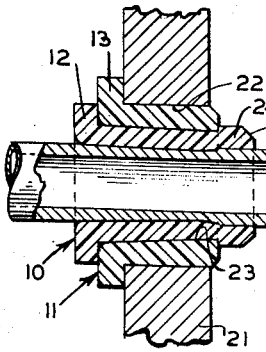
FIGURE 7 is a cross-sectional view of the parts when all assembled in position showing a tubular member which is held by the fitting within a structural member.
Figure 8:
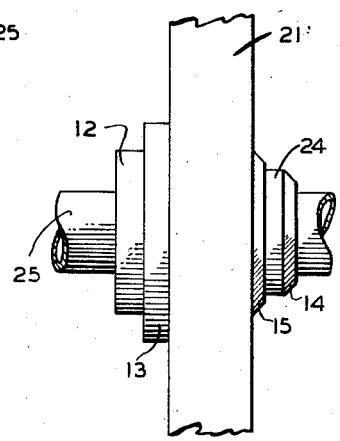
FIGURE 8 is an elevational view of the parts of FIGURE 7 showing the manner in which the interlocking takes place.

In FIGURE 6 the male and female members 10 and 11 are shown placed upon a cylindrical or tubular member 25 carried within male member 10. It is assumed that this member 25 comprises an electrical conductor, a hydraulic line or like cylindrical or tubular device which is to be anchored or secured through and within the structural member 21 by the fitting according to the present invention comprising male and female members 10 and 11. As shown the female member 11 is first placed upon the tube 25 and the male member 10 is placed rearwardly thereof in position to be nested within the female member 11 and ultimately forced therethrough in the direction of the arrow A of FIGURE 6. When this forcing action takes place under suitable pressure, impact or like urging, the parts will assume the position clearly shown in FIGURE 7. It will there be seen that the tube 25 has had portions thereof of the external surface indented or otherwise deformed by the pressure created. This will take place only where the tube 25 has an outer sheath selected to be a flowable material, such as a plastic or thin copper tube. If the tube 25 is selected as completely resistant to such pressure, it would not be indented in any way, and the parts would assume more of the position of FIGURE 3, namely the difference between FIGURE 3 and FIGURE 7 is represented mainly by the resistance of the wall of the tube 25. Thus, by selecting the material of the male and female members 10 and 11 and of the tube 25 it is possible to obtain any desired degree of interlocking of the tube and of the fitting therewith, as hereinbefore disclosed.

It is obvious from the illustrations and from the above description that there is hereby provided a very positive locking action of the male and female members 10 and 11 in connection with the bore 22 within the plate 21 and in connection with the tubular member 25. The tubular member 25 may be replaced by a solid conductor and other shapes can be utilized than the ones illustrated in the drawings without departing from the spirit and scope of the present invention. The female member 11 will of course be locked firmly in place within the plate 21 by the extreme contact of the external diameter thereof with the bore 22 of plate 21, this being resultant of the pressures which are created and maintained between the parts due to their being forced into the positions shown respectively in FIGURES 3 and 7. Actually, there will be a tendency for the material of the body or barrel 19 of the female member 11 to upset or lock around the forward edge of the plate. The barrel 19 extends beyond the edge of the plate, namely in the direction of the extension of the male member 10. However, since this would weaken the interlocking action of the portion 24 and 23, as in FIGURE 3 and in FIGURE 7, it is obvious that such interlocking will not be deliberately achieved because it is not necessary and because it weakens the structure.

The various portions of the fitting and of the tube and plate can be of any material desirable whether it be plastic or otherwise and by arranging the taper of the bore 17 and the respective diameters of the parts involved, it is possible to get any desired interlocking action needed for retaining the tube 25 within the structural member 21 and causing a positive locking action which cannot be disturbed or broken even under high vibrational forces.

What is claimed is:

1. A fitting for permanently retaining a cylindrical member in place in a structural member comprising in combination a male member formed of a plastic material deformable under pressure having an elongated hollow completely cylindrical barrel and an integral flange, a female member formed of plastic material deformable under pressure having an elongated barrel and an integral flange, said barrel being bored throughout its length concentrically to form a tapered cone-shaped orifice having its widest diameter slightly larger than the external diameter of the barrel of said male member, the length of the barrel of the female member being less than the length of the barrel of the male member, whereby under pressure forcing the male member into and through the female member from the widest diameter to the lesser diameter of said tapered bore, the material of said members, when restrained from flowing, will interlock at the portion where said male member barrel extends beyond said female member barrel.

2. A fitting for permanently retaining a cylindrical conduit in place in a structural member comprising in combination a male member having a circular flange and an integral uninterrupted cylindrical body extending therefrom for a selected length, a cylindrical bore concentrically through said body of a diameter to be slip-fit upon the conduit to be retained, a complementary female member having a circular flange and an integral uninterrupted cylindrical body extending for a length which is shorter than the length of said male member body and a frustoconical bore concentrically through said female member body having its widest diameter at the flange end thereof, said widest diameter being a nesting fit with the front end of the body of the male member, said male and female members being formed of yieldable plastic material which can be permanently deformed under pressure, whereby said members will interlock when said male member is forced through said female member.

References Cited in the file of this patent

UNITED STATES PATENTS

| | | |
|---|---|---|
| 885,662 | Bowden | Apr. 21, 1908 |
| 1,192,927 | Mosher | Aug. 1, 1916 |
| 2,514,504 | Moline | July 11, 1950 |
| 2,592,130 | Erb | Apr. 8, 1952 |
| 2,664,458 | Rapata | Dec. 29, 1953 |
| 2,776,151 | Harkenrider | Jan. 1, 1957 |
| 2,784,865 | Rieke | Mar. 12, 1957 |
| 2,876,485 | Cowles | Mar. 10, 1959 |

FOREIGN PATENTS

| | | |
|---|---|---|
| 597,771 | Germany | May 30, 1934 |
| 735,069 | Great Britain | Aug. 10, 1955 |